(12) United States Patent
Jung et al.

(10) Patent No.: US 11,084,921 B2
(45) Date of Patent: Aug. 10, 2021

(54) THERMOPLASTIC RESIN COMPOSITION, METHOD OF PREPARING THE SAME, AND INJECTION-MOLDED ARTICLE INCLUDING THE SAME

(71) Applicant: LG CHEM, LTD., Seoul (KR)

(72) Inventors: Dae San Jung, Daejeon (KR); Seung Hun Han, Daejeon (KR); Seong Lyong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 428 days.

(21) Appl. No.: 16/301,710

(22) PCT Filed: Nov. 29, 2017

(86) PCT No.: PCT/KR2017/013847
§ 371 (c)(1),
(2) Date: Nov. 14, 2018

(87) PCT Pub. No.: WO2018/124505
PCT Pub. Date: Jul. 5, 2018

(65) Prior Publication Data
US 2019/0177523 A1 Jun. 13, 2019

(30) Foreign Application Priority Data
Dec. 28, 2016 (KR) .................. 10-2016-0181150

(51) Int. Cl.
*C08L 25/12* (2006.01)
*C08L 33/20* (2006.01)
(Continued)

(52) U.S. Cl.
CPC .......... *C08L 25/12* (2013.01); *B29C 45/0001* (2013.01); *B60Q 1/44* (2013.01);
(Continued)

(58) Field of Classification Search
CPC ............ B29K 2025/00; B29K 2025/04; B29K 2025/06; B29K 2025/08; B29K 2009/00; B29K 2009/06; B29K 2019/00; B29K 2033/00; B29K 2033/04; B29K 2033/08; B29K 2033/012; B29K 2033/18; B29K 2033/20; B29K 2033/26; B29K 2055/00; B29K 2055/02; B29K 2079/00; B29K 2079/08; B29K 2079/085; B29K 2096/02; B29K 2096/04; B29C 65/00; B29C 65/002; B29C 65/028; B29C 65/06; B29C 65/0609; B29C 65/0618; B29C 65/0627; B29C 65/063; B29C 65/0645; B29C 65/0654; B29C 65/0663; B29C 65/609; B29C 65/08; B29C 65/081; B29C 65/082; B29C 65/083; B29C 65/085; B29C 65/086; B29C 65/087; B29C 65/088; B29C 66/302; B29C 66/3022; B29C 66/30221; B29C 66/30223; B29C 66/3024; B29C 66/50; B29C 66/51; B29C 66/54; B29C 66/541; B29C 66/5412; B29C 66/5414; B29C 66/5416; B29C 66/542; B29C 66/543; B29C 66/5432; B29C 66/545; B29C 66/5452; B29C 66/547; B29C 66/5472; B29C 66/54721; B29C 66/5474; B29C 66/54741; B29C 66/5476; B29C 66/54761; B29C 66/549; B29C 66/71; B29C 66/712; B29C 66/72; B29C 66/731; B29C 66/73111; B29C 66/73112; B29C 66/73113; B29C 66/73115; B29C 66/73116; B29C 66/73117; B29C 66/73118; B29C 66/733; B29C 66/7336; B29C 66/73361; B29C 66/73362; B29C 66/73365; B29C 66/73366; B29C 66/7375; B29C 66/73751; B29C 66/73752; B29C 66/73753; B29C 66/73754; B29C 66/73755;
(Continued)

(56) References Cited

U.S. PATENT DOCUMENTS 5,302,664 A * 4/1994 Eichenauer ............ C08L 25/16
525/238
2015/0065652 A1 3/2015 Kim et al.

FOREIGN PATENT DOCUMENTS

| JP | H04314750 A | 11/1992 |
|----|----|----|
| JP | H08295771 A | 11/1996 |
| JP | H10251478 A | 9/1998 |
| JP | H10292087 A | 11/1998 |
| JP | 2000198905 A | 7/2000 |
| JP | 2000302824 A | 10/2000 |
| JP | 2001253990 A | 9/2001 |
| JP | 2002097334 A | 4/2002 |
| JP | 2002212377 A | 7/2002 |
| JP | 2006137929 A | 6/2006 |

(Continued)

OTHER PUBLICATIONS

English Machine Translation of KR20110056641 prepared Mar. 12, 2021. (Year: 2021).*

(Continued)

*Primary Examiner* — Christopher M Rodd

(57) ABSTRACT

The present invention relates to a thermoplastic resin composition, a method of preparing the same, and an injection-molded article including the same. More particularly, the present invention relates to a thermoplastic resin composition having superior vibration welding properties along with ABS-based resin-specific impact resistance, heat resistance, and the like due to inclusion of an ABS-based graft copolymer including a conjugated diene-based rubber polymer having an average particle diameter of 0.25 to 0.35 μm; a rubber-modified graft copolymer including a diene-based rubber polymer having an average particle diameter of 0.6 to 10 μm and prepared by continuous bulk polymerization; and a matrix resin, and an injection-molded article including the thermoplastic resin composition.

13 Claims, No Drawings

(51) Int. Cl.
  *C08J 5/12* (2006.01)
  *G02B 1/04* (2006.01)
  *F21S 43/20* (2018.01)
  *B29C 45/00* (2006.01)
  *C08L 55/02* (2006.01)
  *B60Q 1/44* (2006.01)
  *C08L 101/00* (2006.01)
  *C08L 25/16* (2006.01)
  *C08L 79/08* (2006.01)
  *B29L 11/00* (2006.01)
  *B29K 25/00* (2006.01)

(52) U.S. Cl.
  CPC .............. *C08J 5/12* (2013.01); *C08L 25/16* (2013.01); *C08L 33/20* (2013.01); *C08L 55/02* (2013.01); *C08L 79/08* (2013.01); *C08L 101/00* (2013.01); *F21S 43/20* (2018.01); *G02B 1/041* (2013.01); *B29K 2025/08* (2013.01); *B29L 2011/0016* (2013.01); *C08J 2333/12* (2013.01); *C08J 2351/00* (2013.01); *C08J 2425/12* (2013.01); *C08J 2433/20* (2013.01); *C08J 2445/00* (2013.01); *C08J 2455/02* (2013.01); *C08L 2205/025* (2013.01); *C08L 2205/03* (2013.01); *C08L 2205/035* (2013.01); *C08L 2205/14* (2013.01); *F21S 43/26* (2018.01)

(58) Field of Classification Search
  CPC .......... B29C 66/73756; B29C 66/7377; B29C 66/73771; B29C 66/73772; B29C 66/73773; B29C 66/73774; B29C 66/73775; B29C 66/73776; B29C 66/739; B29C 66/73; B29C 66/7392; B29C 66/73921; B29C 66/95; B29C 66/951; B29C 66/9511; B29C 66/9512; B29C 66/9513; B29C 66/9515; B29C 66/9516; B29C 66/9517; B29C 45/0001; B29L 2031/3055; B29L 2031/747; B29L 2011/0016; C08J 5/12; C08J 5/121; C08J 2333/00; C08J 2333/02; C08J 2333/04; C08J 2333/06; C08J 2333/08; C08J 2333/10; C08J 2333/12; C08J 2333/14; C08J 2333/16; C08J 2333/18; C08J 2333/20; C08J 2333/22; C08J 2333/24; C08J 2333/26; C08J 2351/00; C08J 2351/02; C08J 2351/04; C08J 2351/06; C08J 2351/08; C08J 2351/10; C08J 2353/00; C08J 2353/02; C08J 2355/00; C08J 2355/02; C08J 2355/04; C08J 2425/00; C08J 2425/02; C08J 2425/04; C08J 2425/06; C08J 2425/08; C08J 2425/10; C08J 2425/12; C08J 2425/14; C08J 2425/16; C08J 2425/18; C08J 2433/00; C08J 2433/02; C08J 2433/04; C08J 2433/06; C08J 2433/08; C08J 2433/10; C08J 2433/12; C08J 2433/14; C08J 2433/16; C08J 2433/18; C08J 2433/20; C08J 2433/22; C08J 2433/24; C08J 2433/26; C08J 2445/00; C08J 2435/00; C08J 2435/02; C08J 2435/04; C08J 2435/06; C08J 2435/08; C08J 2455/00; C08J 2455/02; C08J 2455/04; C08L 25/00; C08L 25/02; C08L 25/04; C08L 25/06; C08L 25/08; C08L 25/10; C08L 25/12; C08L 25/14; C08L 25/16; C08L 25/18; C08L 79/00; C08L 79/04; C08L 79/08; C08L 79/085; C08L 101/00; C08L 101/02; C08L 101/025; C08L 101/06; C08L 101/08; C08L 2205/00; C08L 2205/02; C08L 2205/025; C08L 2205/03; C08L 2205/035; C08L 2205/04; C08L 2205/22; F21S 43/20; F21S 43/26; G02B 1/041
  See application file for complete search history.

(56) References Cited

FOREIGN PATENT DOCUMENTS

| | | | |
|---|---|---|---|
| JP | 2007177059 A | | 7/2007 |
| JP | 2008156577 A | | 7/2008 |
| JP | 4392973 B2 | | 1/2010 |
| JP | 2011508045 A | | 3/2011 |
| KR | 10-1994-0014568 A | | 7/1994 |
| KR | 10-0358235 B1 | | 2/2003 |
| KR | 10-2003-0055445 A | | 7/2003 |
| KR | 10-0528768 B1 | | 11/2005 |
| KR | 10-0591041 B1 | | 6/2006 |
| KR | 20110056641 A | * | 5/2011 |
| KR | 10-2014-0099609 A | | 8/2014 |
| KR | 10-2015-0066647 A | | 6/2015 |
| KR | 10-2015-0072243 A | | 6/2015 |
| WO | WO2006070986 A1 | | 7/2006 |

OTHER PUBLICATIONS

International Search Report for PCT/KR2017/013847 filed on Nov. 29, 2017.

Search Report dated Jan. 23, 2020 for PCT Application No. PCT/KR2017013847.

* cited by examiner

THERMOPLASTIC RESIN COMPOSITION, METHOD OF PREPARING THE SAME, AND INJECTION-MOLDED ARTICLE INCLUDING THE SAME

CROSS-REFERENCE TO RELATED APPLICATION

This application is a U.S. National Stage of PCT/KR2017/013847, filed Nov. 29, 2017 claims the priority benefit of Korean Patent Application No. 10-2016-0181150, filed on Dec. 28, 2016, in the Korean Intellectual Property Office, the disclosures of which are incorporated herein by reference.

TECHNICAL FIELD

The present invention relates to a thermoplastic resin composition, a method of preparing the same, and an injection-molded article including the same. More particularly, the present invention relates to a thermoplastic resin composition having superior vibration welding properties along with ABS-based resin-specific impact resistance, heat resistance, and the like due to inclusion of two ABS-based graft copolymers, conjugated diene-based rubber polymers of which have different particle diameters, in a specific ratio, and an injection-molded article including the same.

BACKGROUND ART

Acrylonitrile-butadiene-styrene-based resin (ABS-based resin) has superior processability, impact resistance and chemical resistance, thereby being widely used as a material for construction, an interior and exterior material for vehicles such as automobiles and motorcycles, a material for electric and electronic products, and the like. Thereamong, an ABS-based resin used as an interior and exterior material for automobiles and the like is gradually required to have high heat resistance and various post-processing characteristics.

For example, since a rear lamp of an automobile is manufactured by coupling a lamp housing and a lens made of poly(methyl methacrylate) (PMMA) by a method such as thermal welding, vibration welding, or laser welding, an ABS-based resin should have high weldability to the PMMA lens as well as high heat resistance when used for the rear lamp housing.

Meanwhile, to couple a heat-resistant ABS-based lamp housing with a lens, a thermal welding method, in which apparatus cost is low, was mainly used in the past. However, in the case of this method, the appearance of finally produced products is poor and productivity is low.

Accordingly, a vibration welding method is favored in consideration of appearance and productivity. However, in the case of an ABS-based injection-molded article manufactured by vibration welding, non-fusion may occur along the shapes of bonded surfaces of the ABS-based injection-molded article. When a vibration time was increased so as to address such a non-fusion phenomenon, debris was generated, which results in a defect in a finally assembled rear lamp. To remove such debris, an additional process was included, which caused productivity decrease.

The problem due to debris can be addressed by employing a laser welding method. However, a laser welding device used in the laser welding method is expensive, thereby being non-preferred in terms of economic efficiency. Therefore, there is an urgent need for development of a material capable of addressing defective problems due to foreign matter.

RELATED ART DOCUMENT

[Patent Document] (Patent Document 1) KR 10-0528768 B1

DISCLOSURE

Technical Problem

Therefore, the present invention has been made in view of the above problems, and it is one object of the present invention to provide a thermoplastic resin composition having improved vibration weldability along with superior ABS-based resin-specific mechanical strength, heat resistance, and the like, and a method of preparing the same.

It is another object of the present invention to provide an injection-molded article manufactured from the thermoplastic resin composition, the injection-molded article exhibiting improved vibration weldability. Accordingly, the present invention contributes to manufacturing cost reduction, defect rate decrease, productivity increase, and the like upon manufacturing a rear lamp for automobiles.

The above and other objects can be accomplished by the present disclosure described below.

Technical Solution

In accordance with one aspect of the present invention, provided is a thermoplastic resin composition, including: (A) 20 to 30% by weight of an ABS-based graft copolymer including a conjugated diene-based rubber polymer having an average particle diameter of 0.25 to 0.35 μm; (B) 2 to 10% by weight of a rubber-modified graft copolymer including a rubber polymer having an average particle diameter of 0.6 to 10 μm and prepared by continuous bulk polymerization; and (C) 60 to 80% by weight of a matrix resin, wherein, when a molded article manufactured from the thermoplastic resin composition is vibration-welded to a molded article that is made of poly(methyl methacrylate) (PMMA) and includes vibration-welding projections on one surface thereof (under conditions of a frequency of 230 Hz, a pressure of 480 kgf, and an amplitude of 1.2 mm), a vibration weldability calculated by Mathematical Equation 1 below is 6 or less:

$$\text{Vibration weldability (seconds)} = T2 - T1 \quad \text{[Mathematical Equation 1]}$$

wherein T2 is a time required for vibration welding in a direction of 80° to a direction of welding projections, and T1 is a time required for vibration welding in parallel with the direction of the welding projections.

In accordance with another aspect of the present invention, provided is a method of preparing a thermoplastic resin composition, the method including a step of kneading and extruding (A) 20 to 30% by weight of an ABS-based graft copolymer including a conjugated diene-based rubber polymer having an average particle diameter of 0.25 to 0.35 μm; (B) 2 to 10% by weight of a rubber-modified graft copolymer including a rubber polymer having an average particle diameter of 0.6 to 10 μm and prepared by continuous bulk polymerization; and (C) 60 to 80% by weight of a matrix resin.

In accordance with another aspect of the present invention, provided is an injection-molded article manufactured by injection-molding the thermoplastic resin composition.

In accordance with yet another aspect of the present invention, provided is a rear lamp module for automobiles, wherein the rear lamp module is manufactured by vibration-welding the injection-molded article to a lens made of PMMA.

Advantageous Effects

As apparent from the fore-going, the present invention advantageously provides a thermoplastic resin composition providing improved vibration welding properties while maintaining heat-resistant ABS-based resin-specific mechanical strength and heat resistance, and an injection-molded article manufactured from the same.

Further, the injection-molded article according to the present invention has improved vibration weldability, thereby contributing to manufacturing cost reduction, product quality increase, and productivity increase upon manufacturing a rear lamp module for automobiles.

BEST MODE

Hereinafter, a thermoplastic resin composition of the present disclosure is described in detail.

The thermoplastic resin composition of the present invention includes (A) 20 to 30% by weight of an ABS-based graft copolymer including a conjugated diene-based rubber polymer having an average particle diameter of 0.25 to 0.35 μm; (B) 2 to 10% by weight of a rubber-modified graft copolymer including a rubber polymer having an average particle diameter of 0.6 to 10 μm and prepared by continuous bulk polymerization; and (C) 60 to 80% by weight of a matrix resin, wherein, when a sheet (130 mm in width and 130 mm in length) manufactured from the thermoplastic resin composition is vibration-welded to a sheet (130 mm in width and 130 mm in length) that is made of poly(methyl methacrylate) (PMMA) and includes vibration-welding projections on one surface thereof (under conditions of a frequency of 230 Hz, a pressure of 480 kgf, and an amplitude of 1.2 mm), a vibration weldability calculated by Mathematical Equation 1 below is 6 or less:

Vibration weldability (seconds)=$T2-T1$    [Mathematical Equation 1]

wherein T2 is a time required for vibration welding in a direction of 80° to a direction of welding projections, and T1 is a time required for vibration welding in parallel with the direction of the welding projections.

In another embodiment, the thermoplastic resin composition of the present disclosure includes (A) 20 to 30% by weight of an ABS-based graft copolymer including a conjugated diene-based rubber polymer having an average particle diameter of 0.25 to 0.35 μm; (B) 2 to 10% by weight of a rubber-modified graft copolymer including a rubber polymer having an average particle diameter of 0.6 to 10 μm and prepared by continuous bulk polymerization; and (C) 60 to 80% by weight of a matrix resin, wherein a weight ratio of the rubber polymer having the average particle diameter of 0.6 to 10 μm to the conjugated diene-based rubber polymer having an average particle diameter of 0.25 to 0.35 μm is 1 to 1:2 or 1:13 to 1:5.

Hereinafter, each ingredient included in the thermoplastic resin composition of the present disclosure is described in detail.

(A) ABS-Based Graft Copolymer Including Conjugated Diene-Based Rubber Polymer Having Average Particle Diameter of 0.25 to 0.35 μm The ABS-based graft copolymer (A) is a copolymer prepared by grafting a conjugated diene-based rubber polymer having an average particle diameter of 0.25 to 0.35 μm (hereinafter referred to as "small-diameter rubber polymer") with an aromatic vinyl compound and a vinyl cyanide compound.

In the present disclosure, the conjugated diene-based rubber polymer refers to a polymer of a conjugated compound having a structure wherein a double bond and a single bond are alternately arranged.

For example, the conjugated diene-based rubber polymer may include one or more of a butadiene polymer, a butadiene-styrene copolymer, a butadiene-acrylonitrile copolymer, an ethylene-propylene copolymer, and polymers derived therefrom. Preferably, the conjugated diene-based rubber polymer is a butadiene polymer or a butadiene-styrene copolymer.

In the present disclosure, the expression "polymers derived therefrom" refers to polymers prepared by polymerizing a monomer compound or polymer not included in an original polymer, or polymers prepared by polymerizing a derivative of a conjugated compound.

In the present disclosure, the expression "derivative" refers to a compound, a hydrogen atom or atomic group of an original compound of which is substituted with other atom or atomic group, for example, a halogen or an alkyl group.

The small-diameter rubber polymer may have an average particle diameter of, for example, 0.25 to 0.35 μm, 0.27 to 0.35 μm, or 0.28 to 0.32 μm. Within this range, a finally molded article has superior mechanical properties, such as impact strength, and appearance characteristics.

In the present disclosure, an average particle diameter may be measured by means of a Nicomp 380 device according to a dynamic light scattering method.

The ABS-based graft copolymer (A) may include, for example, 40 to 70% by weight of the small-diameter rubber polymer, 12 to 35% by weight of the aromatic vinyl compound, and 6 to 25% by weight of the vinyl cyanide compound. Within this range, properties such as mechanical strength, processability, and heat resistance are superior.

In another embodiment, the ABS-based graft copolymer (A) may include 45 to 68% by weight of the small-diameter rubber polymer, 14 to 35% by weight of the aromatic vinyl compound, and 6 to 20% by weight of the vinyl cyanide compound. In this case, balance between properties such as heat resistance and mechanical strength is superior.

In another embodiment, the ABS-based graft copolymer (A) may include 48 to 65% by weight of the small-diameter rubber polymer, 20 to 35% by weight of the aromatic vinyl compound, and 7 to 17% by weight of the vinyl cyanide compound. In this case, properties such as heat resistance and mechanical strength are superior.

In the present disclosure, the aromatic vinyl compound may be, for example, one or more selected from styrene, α-methyl styrene, p-methyl styrene, and vinyl toluene. Preferably, the aromatic vinyl compound includes styrene.

In the present disclosure, the vinyl cyanide compound may be, for example, one or more selected from acrylonitrile, methacrylonitrile, and ethacrylonitrile. Preferably, the vinyl cyanide compound includes acrylonitrile.

In a particular embodiment, the ABS-based graft copolymer (A) may be a small-diameter butadiene rubber polymer-styrene-acrylonitrile copolymer. In this case, a final product has superior properties.

The ABS-based graft copolymer (A) is preferably included in an amount of 20 to 30% by weight, 22 to 30% by weight or 23 to 27% by weight based on a total weight of the ABS-based graft copolymer (A), the rubber-modified graft copolymer (B), and the matrix resin (C). In this case superior property balance and the like are provided.

(B) Rubber-Modified Graft Copolymer Including a Rubber Polymer Having an Average Particle Diameter of 0.6 to 10 μm and Prepared by Continuous Bulk Polymerization The rubber-modified graft copolymer (B) is a copolymer prepared by grafting a conjugated diene-based rubber polymer having an average particle diameter of 0.6 to 10 μm (hereinafter referred to as "large-diameter rubber polymer") with an aromatic vinyl compound and a vinyl cyanide compound.

The large-diameter rubber polymer may have an average particle diameter of, for example, 0.6 to 10 μm, 0.6 to 8 μm, 0.65 to 5 μm, 0.65 to 3 μm, 5 to 10 μm, or 6 to 9 μm. Within this range, mechanical strength of the thermoplastic resin composition is superior and vibration welding properties thereof are improved.

The rubber-modified graft copolymer (B) may include, for example, 5 to 20% by weight of the large-diameter rubber polymer, 50 to 70% by weight of the aromatic vinyl compound, and 10 to 30% by weight of the vinyl cyanide compound. Within this range, properties such as mechanical strength and heat resistance are superior and weldability upon vibration welding may be improved.

In another embodiment, the rubber-modified graft copolymer (B) may include 8 to 15% by weight of the large-diameter rubber polymer, 52 to 75% by weight of the aromatic vinyl compound, and 12 to 35% by weight of the vinyl cyanide compound. Within this range, properties such as mechanical strength and heat resistance are superior, and a defect rate is reduced and productivity increases upon post-processing due to improved vibration weldability.

The aromatic vinyl compound and the vinyl cyanide compound may include the same compounds as those included in the ABS-based graft copolymer (A).

In a particular embodiment, the rubber-modified graft copolymer (B) may be a large-diameter butadiene rubber polymer-styrene-acrylonitrile copolymer. In this case, a final product has superior properties and vibration welding properties thereof are improved.

The rubber-modified graft copolymer (B) is preferably included in an amount of 2 to 10% by weight, 3 to 10% by weight, or 3 to 7% by weight based on a total weight of the ABS-based graft copolymer (A), the rubber-modified graft copolymer (B), and the matrix resin (C). Within this range, the thermoplastic resin composition has superior property balance and weldability thereof is improved.

A weight ratio of the ABS-based graft copolymer (A) to the rubber-modified graft copolymer (B) is preferably 1:3 to 1:10, more preferably 1:5 to 1:9. Within this range, a finally molded article has superior property balance and improved vibration welding properties.

A total content of the ABS-based graft copolymer (A) and the rubber-modified graft copolymer (B) is preferably 20 to 40% by weight or 25 to 35% by weight based on a total weight of the thermoplastic resin composition of the present disclosure. Within this range, property balance and processability are superior and vibration weldability is improved.

In addition, a weight ratio of the large-diameter rubber polymer to the small-diameter rubber polymer included in the thermoplastic resin composition of the present disclosure is preferably 1:15 to 1:3 or 1:13 to 1:6. Within this range, a vibration welding properties is improved without decrease in ABS-based resin-specific mechanical strength, processability, heat resistance, and the like, thereby producing a molded article having superior quality.

(C) Matrix Resin

The matrix resin may be a heat-resistant styrene-based resin known in the art. For example, the matrix resin may include an alpha-alkyl styrene-aromatic vinyl compound-vinyl cyanide compound copolymer, an alpha-alkyl styrene-vinyl cyanide compound copolymer, a maleimide compound-aromatic vinyl compound copolymer, or all thereof. When the heat-resistant styrene-based resin is included in the matrix resin, the thermoplastic resin composition has excellent mechanical strength and superior processability and heat resistance.

In the present disclosure, an aromatic vinyl compound in the alpha-alkyl styrene-aromatic vinyl compound-vinyl cyanide compound copolymer is not alpha-alkyl styrene.

The heat-resistant styrene-based resin may have a glass transition temperature of, for example, 115° C. or more, or 115 to 140° C. Within this range, a final resin composition has superior processability and heat resistance.

In the present disclosure, glass transition temperature may be measured by differential scanning calorimetry (DSC).

The alpha-alkyl styrene-aromatic vinyl compound-vinyl cyanide compound copolymer may include, for example, 50 to 80% by weight or 60 to 75% by weight of alpha-alkyl styrene; 0 to 15% by weight or 0 to 10% by weight of an aromatic vinyl compound; and 20 to 50% by weight or 25 to 40% by weight of a vinyl cyanide compound. In this case, a resultant resin composition has superior mechanical strength, heat resistance, and the like.

In the present disclosure, the alpha-alkyl styrene may be one or more selected from alpha-methyl styrene and alpha-ethyl styrene. Preferably, the alpha-alkyl styrene includes alpha-methyl styrene.

In a particular embodiment, the alpha-alkyl styrene-aromatic vinyl compound-vinyl cyanide compound copolymer may be an alpha-methyl styrene-styrene-acrylonitrile copolymer, and the alpha-alkyl styrene-vinyl cyanide compound copolymer may be an alpha-methyl styrene-acrylonitrile copolymer, but it should be noted that the present disclosure is not limited thereto.

The maleimide compound-aromatic vinyl compound copolymer may include, for example, 30 to 70% by weight of a maleimide compound, 30 to 60% by weight of an aromatic vinyl compound, and 0 to 10% by weight of a maleic anhydride. In this case, a resultant resin composition has superior mechanical strength and the like, and high heat resistance.

In another embodiment, the maleimide compound-aromatic vinyl compound copolymer may include 40 to 60% by weight of a maleimide compound, 40 to 55% by weight of an aromatic vinyl compound, and greater than 0 and 8% by weight or less of a maleic anhydride. Within this range, heat resistance is superior.

The maleimide compound may be, for example, one or more selected from the group consisting of N-phenyl maleimide, N-methyl maleimide, N-ethyl maleimide, N-butyl maleimide, and N-cyclohexyl maleimide. Preferably, the maleimide compound includes N-phenyl maleimide.

In a particular embodiment, the maleimide compound-aromatic vinyl compound copolymer may be an N-phenyl-maleimide-styrene-maleic anhydride copolymer, but it should be noted that the present disclosure is not limited thereto.

In addition, the matrix resin may be prepared by mixing an aromatic vinyl compound-vinyl cyanide compound copolymer with the heat-resistant styrene-based resin so as to improve processability.

In a particular embodiment, the matrix resin may include 15 to 35% by weight of a maleimide compound-aromatic vinyl compound copolymer and 65 to 85% by weight of an aromatic vinyl compound-vinyl cyanide compound copolymer. In this case, both heat resistance and processability are superior.

In another embodiment, the matrix resin may include 25 to 33% by weight of a maleimide compound-aromatic vinyl compound copolymer and 67 to 75% by weight of an aromatic vinyl compound-vinyl cyanide compound copolymer. Within this range, heat resistance, processability, and the like are superior.

The aromatic vinyl compound-vinyl cyanide compound may include, for example, 60 to 80% by weight of an aromatic vinyl compound and 20 to 40% by weight of a vinyl cyanide compound. Within this range, a resultant resin composition has superior processability.

In a particular embodiment, the aromatic vinyl compound-vinyl cyanide compound may be a styrene-acrylonitrile copolymer, but it should be noted that the present disclosure is not limited thereto.

In addition, the aromatic vinyl compound-vinyl cyanide compound preferably has a weight average molecular weight of, for example, 60,000 to 200,000 g/mol, or 80,000 to 180,000 g/mol. Within this range, a resultant resin composition has improved fluidity without decrease in heat resistance, thereby having superior processability.

In the present disclosure, weight average molecular weight may be measured by a gel permeation chromatography method after pre-processing by dissolving a sample in a solvent (e.g., THF).

The thermoplastic resin composition according to the present invention is prepared by two ABS-based graft copolymers, which respectively include conjugated diene-based rubber polymers having different average particle diameters, with a heat-resistant matrix resin, thereby having improved vibration welding properties while maintaining ABS-based resin-specific impact resistance, heat resistance, and the like.

In particular, when a molded article manufactured from the thermoplastic resin composition is vibration-welded with a molded article made of poly(methyl methacrylate) (PMMA) and including vibration-welding projections on one surface thereof (under conditions of a frequency of 230 Hz, a pressure of 480 kgf, and an amplitude of 1.2 mm), a vibration weldability calculated by Mathematical Equation 1 is 6 or less, 5.5 or less, 5.0 or less, or 4.5 or less.

In addition, the thermoplastic resin composition of the present invention may selectively, further include at least one additive, known in the art, as needed.

The additive may be one or more selected from, for example, a lubricant, an antioxidant, a heat stabilizer, a light stabilizer, a colorant, an antistatic agent, and the like.

Other additives not explicitly described in the description of the thermoplastic resin composition of the present invention are not particularly limited when they are within a range usually practiced in the technical field to which the present invention pertains and may be appropriately selected and used as needed.

Hereinafter, a method of preparing the thermoplastic resin composition of the present disclosure is described.

The method of preparing the thermoplastic resin composition of the present invention includes a step of kneading and extruding (A) 20 to 30% by weight of an ABS-based graft copolymer including a conjugated diene-based rubber polymer having an average particle diameter of 0.25 to 0.35 µm; (B) 2 to 10% by weight of a rubber-modified graft copolymer including a rubber polymer having an average particle diameter of 0.6 to 10 µm and prepared by continuous bulk polymerization; and (C) 60 to 80% by weight of a matrix resin.

Upon the kneading, an additive, such as a lubricant, an antioxidant, a light stabilizer, or a colorant, may be selectively, further included as needed.

The additive may be included in an amount of 0.1 to 5 parts by weight or 0.5 to 3 parts by weight based on 100 parts by weight of a sum of the ABS-based graft copolymer (A), the rubber-modified graft copolymer (B), and the matrix resin (C). Within this range, effect due to addition of the additive may be exhibited without decrease in properties, such as mechanical strength and heat resistance, of a final product.

The kneading and the extruding may be carried out at 100 to 800 rpm or 150 to 750 rpm and 200 to 300° C. or 220 to 280° C. Within this range, superior processability and moldability are provided.

The thermoplastic resin composition of the present disclosure may be manufactured into an injection-molded article through an injection molding process. The injection-molded article has a heat deflection temperature of, for example, 95° C. or more, or 95 to 112° C., thereby having superior heat resistance.

In the present disclosure, heat deflection temperature may be measured under a load of 18.5 kgf/cm$^2$ using a specimen with a thickness of ¼" according to ASTM D648.

The injection-molded article according to the present disclosure has superior properties such as heat resistance and impact resistance, thereby being applied to products for various purposes. In particular, the injection-molded article having improved vibration welding properties may be used as a rear lamp module for automobiles manufactured by bonding a rear lamp housing and the like through vibration welding.

For example, the injection-molded article according to the present disclosure may be a rear lamp housing for automobiles. The rear lamp housing may be bonded with a lens made of PMMA by a vibration welding method, thereby being manufactured into a rear lamp module for automobiles.

In particular, the bonding process by a vibration welding method may include a process of forming vibration-welding projections on one surface of an upper part made of PMMA, disposing the vibration-welding projections-formed surface to face one surface of an injection-molded article (a lower part) manufactured from the thermoplastic resin composition of the present invention, and melting the vibration-welding projections between the upper part and the lower part by means of a vibration welding machine to bond the upper part and the lower part to each other.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

Materials used in examples and comparative examples below were as follows:

A) ABS-based graft copolymer including a small-diameter rubber polymer

A1) As an ABS graft copolymer including a butadiene rubber polymer having an average particle diameter of 0.3 µm, DP270 manufacture by LG CHEM, LTD. was used.

B) ABS-based graft copolymer including a large-diameter rubber polymer

B1) As an ABS resin including a butadiene rubber polymer having an average particle diameter of 0.7 µm, AT-08 manufactured by Nippon A&L was used.

B2) As an ABS resin including a butadiene rubber polymer having an average particle diameter of 1.2 µm, MA201 manufactured by LG CHEM, LTD. was used.

B3) As an ABS resin including a butadiene rubber polymer having an average particle diameter of 8 µm, MA210 manufactured by LG CHEM, LTD. was used.

C) Matrix resin

C1) As a (alpha-methyl styrene)-styrene-acrylonitrile copolymer, 98UHM manufactured by LG CHEM, LTD. was used.

C2) As a N-phenylmaleimide-styrene-maleic anhydride copolymer, MS-NB manufactured by Denka was used.

C3) As a styrene-acrylonitrile copolymer, 92HR manufactured by LG CHEM, LTD. was used.

Example

Examples 1 to 8 and Comparative Examples 1 to 9

A pellet-type resin composition according to each Examples 1 to 8 and Comparative Examples 1 to 9 was prepared by extruding ingredients summarized in Tables 1 and 2 below in contents disclosed therein under conditions of 230° C. and 200 rpm by means of a twin-screw extruder.

The pellet-type resin composition was injection-molded (230° C., 150 bar), thereby being manufactured into a specimen for measuring properties.

TABLE 1

| Classification | Examples | | | | | | | |
| --- | --- | --- | --- | --- | --- | --- | --- | --- |
| | 1 | 2 | 3 | 4 | 5 | 6 | 7 | 8 |
| A1 | 26 | 27 | 22 | 26 | 26 | 26 | 26 | 26 |
| B1 | 4 | — | — | — | 4 | — | — | — |
| B2 | — | 3 | 8 | — | — | 4 | — | 4 |
| B3 | — | — | — | 4 | — | — | 4 | — |
| C1 | 70 | 70 | 70 | 70 | — | — | — | — |
| C2 | — | — | — | — | 20 | 20 | 20 | 26 |
| C3 | — | — | — | — | 50 | 50 | 50 | 44 |
| A/B* | 6.5 | 9.0 | 2.8 | 6.5 | 6.5 | 6.5 | 6.5 | 6.5 |

The content of each ingredient is represented by % by weight based on 100% by weight of the sum of A + B + C.
A/B*: Content ratio of graft copolymer (A) to graft copolymer (B)

TABLE 2

| Classification | Comparative examples | | | | | | | | |
| --- | --- | --- | --- | --- | --- | --- | --- | --- | --- |
| | 1 | 2 | 3 | 4 | 5 | 6 | 7 | 8 | 9 |
| A1 | 26 | 25 | 14 | 26 | 17 | 33 | 25 | 20 | 26 |
| B1 | — | — | — | — | — | — | — | — | — |
| B2 | — | 1 | 12 | — | 4 | 4 | 1 | 12 | — |
| B3 | — | — | — | — | — | — | — | — | — |
| C1 | 74 | 74 | 74 | — | — | — | — | — | — |
| C2 | — | — | — | 20 | 20 | 20 | 20 | 20 | 26 |
| C3 | — | — | — | 54 | 59 | 43 | 54 | 48 | 48 |
| A/B* | — | 25.0 | 1.2 | — | 4.3 | 8.3 | 25.0 | 1.7 | — |

The content of each ingredient is represented by % by weight based on 100% by weight of the sum of A + B + C.
A/B*: Content ratio of graft copolymer (A) to graft copolymer (B)

Test Example

Properties of the specimen manufactured according to each of the examples and the comparative examples were measured by the following methods. Results are summarized in Tables 3 and 4 below.

1) Heat deflection temperature (HDT, g/10 min): Measured under conditions of a temperature increase rate of 120° C./hour and a load of 18.5 kgf/cm² using a specimen having a thickness of ¼" according to ASTM D648.

2) Vibration weldability evaluation: For vibration weldability evaluation, a resin composition having ingredients and contents disclosed in Table 1 was injection-molded, thereby manufacturing a flat lower part having a width of 130 mm and a length of 130 mm. An upper part was made of PMMA and vibration-welding projections were formed on the upper part. The upper part including the vibration-welding projections thereon was injection-molded into the same size and shape as the flat lower part.

The upper part and the lower part were mounted in a vibration welding machine (730e, Daeyoung ultrasonic) such that the surface of the upper part, on which vibration-welding projections are formed, faced one surface of the lower part. Subsequently, a time required for vibration welding in parallel to a direction of the welding projections was measured (T1, seconds) under conditions such as a frequency of 230 Hz, a pressure of 480 kgf, an amplitude of 1.2 mm, and a depth mode of 1 mm, and a time required for vibration welding in a direction of 80° to a direction of the welding projections was measured (T2, seconds) under the same conditions. Vibration welding properties are superior as a difference between T2 and T1 is small.

3) Izod impact strength (IMP, kgcm/cm): Measured using a specimen having a thickness of ¼" according to ASTM D256.

4) Appearance evaluation: A surface state of a specimen was evaluated with the naked eye (0: excellent, A: good, X: poor)

TABLE 3

| Classification | Examples | | | | | | | |
|---|---|---|---|---|---|---|---|---|
| | 1 | 2 | 3 | 4 | 5 | 6 | 7 | 8 |
| HDT | 97 | 98 | 96 | 97 | 101 | 102 | 101 | 105 |
| T2 − T1 | 4.9 | 4.6 | 4.3 | 4.4 | 5.2 | 5.0 | 5.0 | 4.9 |
| IMP | 21 | 23 | 22 | 22 | 14 | 15 | 16 | 12 |
| Appearance evaluation | ○ | ○ | ○ | ○ | ○ | ○ | ○ | ○ |

TABLE 4

| Classification | Comparative examples | | | | | | | | |
|---|---|---|---|---|---|---|---|---|---|
| | 1 | 2 | 3 | 4 | 5 | 6 | 7 | 8 | 9 |
| HDT | 100 | 100 | 98 | 101 | 102 | 100 | 101 | 98 | 106 |
| T2 − T1 | 7.1 | 7.0 | 4.7 | 7.7 | 5.1 | 5.6 | 7.3 | 4.8 | 8.1 |
| IMP | 20 | 20 | 11 | 13 | 7 | 19 | 13 | 12 | 11 |
| Appearance evaluation | ○ | ○ | Δ | ○ | ○ | Δ | ○ | Δ | ○ |

As shown in Tables 3 and 4, it can be confirmed that the specimens manufactured from the thermoplastic resin compositions of the present disclosure exhibit superior vibration welding properties and appearance characteristics along with identical or superior impact strength and heat deflection temperature, compared to the specimens according to Comparative Examples.

In particular, it can be confirmed that, when a N-phenyl-maleimide-styrene-maleic anhydride copolymer is included as a matrix resin, heat resistance is further improved, but vibration welding properties are somewhat decreased.

The invention claimed is:

1. A thermoplastic resin composition, comprising: (A) 20 to 30% by weight of an ABS-based graft copolymer comprising a conjugated diene-based rubber polymer having an average particle diameter of 0.25 to 0.35 µm; (B) 2 to 10% by weight of a rubber-modified graft copolymer comprising a rubber polymer having an average particle diameter of 0.6 to 10 µm and prepared by continuous bulk polymerization; and (C) 60 to 80% by weight of a matrix resin,
wherein, when a sheet (130 mm in width and 130 mm in length) manufactured from the thermoplastic resin composition is vibration-welded to a sheet (130 mm in width and 130 mm in length) that is made of poly(methyl methacrylate) (PMMA) and comprises vibration-welding projection on one surface thereof (under conditions of a frequency of 230 Hz, a pressure of 480 kgf, and an amplitude of 1.2 mm), a vibration weldability calculated by Mathematical Equation 1 below is 6 or less:

Vibration weldability (seconds)=$T2-T1$    [Mathematical Equation 1]

wherein T2 is a time required for vibration welding in a direction of 80° to a direction of welding projections, and T1 is a time required for vibration welding in parallel with the direction of the welding projections, and
wherein the rubber-modified graft copolymer (B) comprises 5 to 20% by weight of the rubber polymer having an average particle diameter of 0.6 to 10 µm, 50 to 70% by weight of an aromatic vinyl compound, and 10 to 30% by weight of a vinyl cyanide compound.

2. The thermoplastic resin composition according to claim 1, wherein a weight ratio of the conjugated diene-based rubber polymer having an average particle diameter of 0.6 to 10 µm to the rubber polymer having an average particle diameter of 0.25 to 0.35 µm is 1:15 to 1:2.

3. The thermoplastic resin composition according to claim 1, wherein the ABS-based graft copolymer (A) comprises 40 to 70% by weight of the conjugated diene-based rubber polymer having an average particle diameter of 0.25 to 0.35 µm, 12 to 35% by weight of an aromatic vinyl compound, and 6 to 25% by weight of a vinyl cyanide compound.

4. The thermoplastic resin composition according to claim 1, wherein the matrix resin (C) comprises one or more of an alpha-alkyl styrene-aromatic vinyl compound-vinyl cyanide compound copolymer or an alpha-alkyl styrene-vinyl cyanide compound copolymer; and a maleimide compound-aromatic vinyl compound copolymer, wherein an aromatic vinyl compound in the alpha-alkyl styrene-aromatic vinyl compound-vinyl cyanide compound copolymer is not alpha-alkyl styrene.

5. The thermoplastic resin composition according to claim 4, wherein the matrix resin (C) comprises 15 to 30% by weight of the maleimide compound-aromatic vinyl compound copolymer and 70 to 85% by weight of an aromatic vinyl compound-vinyl cyanide compound copolymer.

6. The thermoplastic resin composition according to claim 4, wherein the alpha-alkyl styrene-aromatic vinyl compound-vinyl cyanide compound copolymer comprises 50 to 80% by weight of an alpha-alkyl styrene, 0 to 15% by weight of an aromatic vinyl compound, and 20 to 50% by weight of a vinyl cyanide compound.

7. The thermoplastic resin composition according to claim 4, wherein the maleimide compound-aromatic vinyl compound copolymer comprises 30 to 70% by weight of a maleimide compound, 30 to 60% by weight of an aromatic vinyl compound, and 0 to 10% by weight of a maleic anhydride.

8. The thermoplastic resin composition according to claim 7, wherein the maleimide compound is one or more selected from the group consisting of N-phenyl maleimide, N-methyl maleimide, N-ethyl maleimide, N-butyl maleimide, and N-cyclohexyl maleimide.

9. A method of preparing a thermoplastic resin composition, the method comprising a step of kneading and extruding (A) 20 to 30% by weight of an ABS-based graft copolymer comprising a conjugated diene-based rubber polymer having an average particle diameter of 0.25 to 0.35 μm; (B) 2 to 10% by weight of a rubber-modified graft copolymer comprising a rubber polymer having an average particle diameter of 0.6 to 10 μm and prepared by continuous bulk polymerization; and (C) 60 to 80% by weight of a matrix resin, wherein, when a molded article manufactured from the thermoplastic resin composition is vibration-welded to a molded article that is made of poly(methyl methacrylate) (PMMA) and comprises vibration-welding projections on one surface thereof (under conditions of a frequency of 230 Hz, a pressure of 480 kgf, and an amplitude of 1.2 mm), a vibration weldability calculated by Mathematical Equation 1 below is 6 or less:

Vibration weldability (seconds)=$T2-T1$  [Mathematical Equation 1]

wherein $T2$ is a time required for vibration welding in a direction of 80° to a direction of the welding projections, and $T1$ is a time required for vibration welding in parallel with the direction of the welding projections and wherein the rubber-modified graft copolymer (B) comprises 5 to 20% by weight of the rubber polymer having an average particle diameter of 0.6 to 10 μm, 50 to 70% by weight of an aromatic vinyl compound, and 10 to 30% by weight of a vinyl cyanide compound.

10. An injection-molded article manufactured by injection-molding the thermoplastic resin composition according to claim 1.

11. The injection-molded article according to claim 10, wherein the injection-molded article has a heat deflection temperature of 95° C. or more (under conditions of a temperature increase rate of 120° C./hour and a load of 18.5 kgf/cm$^2$).

12. The injection-molded article according to claim 10, wherein the injection-molded article is a rear lamp housing for automobiles.

13. A rear lamp module for automobiles, wherein the rear lamp module is manufactured by vibration-welding the injection-molded article according to claim 12 to a lens made of PMMA.

* * * * *